(12) United States Patent
Cian et al.

(10) Patent No.: US 8,698,963 B1
(45) Date of Patent: Apr. 15, 2014

(54) PROJECTION SYSTEM AND OPERATION METHOD THEREOF

(71) Applicants: Jyun-Lin Cian, Hsin-Chu (TW); Jui-Chi Chen, Hsin-Chu (TW)

(72) Inventors: Jyun-Lin Cian, Hsin-Chu (TW); Jui-Chi Chen, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 14/084,632

(22) Filed: Nov. 20, 2013

(30) Foreign Application Priority Data

Nov. 23, 2012 (CN) .......................... 2012 1 0480929

(51) Int. Cl.
*H04N 5/64* (2006.01)
*H04N 9/31* (2006.01)

(52) U.S. Cl.
USPC ........... 348/744; 348/738; 348/730; 348/725; 348/564; 348/565; 348/423.1; 348/432.1; 348/437.1; 348/438.1; 348/441; 348/383; 348/180; 348/136; 348/14.01; 345/1.3; 353/94; 375/240.02

(58) Field of Classification Search
USPC ........... 348/744, 136, 180, 14.01, 383, 231.4, 348/423.1, 432.1, 437.1, 438.1, 441, 564, 348/565, 730, 725, 738; 353/94; 345/1.3; 375/240.02
See application file for complete search history.

(56) References Cited

U.S. PATENT DOCUMENTS

| 6,469,706 | B1* | 10/2002 | Syeda-Mahmood ......... 345/589 |
| 6,633,608 | B1* | 10/2003 | Miller ...................... 375/240.02 |
| 7,366,886 | B2 | 4/2008 | Yoo |
| 7,787,678 | B2* | 8/2010 | Unal et al. .................... 382/128 |
| 7,832,126 | B2* | 11/2010 | Koellner et al. ................ 37/348 |
| 8,527,640 | B2* | 9/2013 | Reisman ....................... 709/228 |
| 2005/0246752 | A1* | 11/2005 | Liwerant et al. .............. 725/109 |
| 2008/0250458 | A1* | 10/2008 | Roman .......................... 725/61 |
| 2008/0261517 | A1* | 10/2008 | Lin .............................. 455/3.06 |
| 2009/0320073 | A1* | 12/2009 | Reisman ........................ 725/51 |
| 2011/0219419 | A1* | 9/2011 | Reisman ....................... 725/112 |
| 2011/0248918 | A1* | 10/2011 | Yoo et al. ...................... 345/157 |
| 2012/0069131 | A1* | 3/2012 | Abelow .................... 348/14.01 |
| 2012/0177258 | A1* | 7/2012 | Hakl et al. .................... 382/128 |

* cited by examiner

*Primary Examiner* — Jefferey Harold
*Assistant Examiner* — Mustafizur Rahman
(74) *Attorney, Agent, or Firm* — Jiang Chyun IP Office

(57) ABSTRACT

A projection system and an operation method thereof are provided. The projection system includes a video and audio source, an image duplication unit, a plurality of image segmentation units, and a plurality of projectors. The video and audio source receives a sum image parameter, and provides a non-standard format image. The image duplication unit receives and sends one of sum image parameters to the video and audio source. The image segmentation units provide the same sum image parameters, though only one is transmitted to the video and audio source through the image duplication unit. Each of the image segmentation units receives the non-standard format image, and segments a part of the non-standard format image as a standard format image, where the standard format images are partially overlapped with each other. The projectors are respectively coupled to the corresponding image segmentation unit, and display according to the corresponding standard format image.

14 Claims, 4 Drawing Sheets

US 8,698,963 B1

PROJECTION SYSTEM AND OPERATION METHOD THEREOF

CROSS-REFERENCE TO RELATED APPLICATION

This application claims the priority benefit of China application serial no. 201210480929.X, filed on Nov. 23, 2012. The entirety of the above-mentioned patent application is hereby incorporated by reference herein and made a part of this specification.

BACKGROUND

1. Technical Field

The invention relates to a projection system and an operation method thereof. Particularly, the invention relates to a projection system projecting non-standard format image and an operation method thereof.

2. Related Art

A projector projects an image on a large screen to facilitate more people simultaneously viewing content displayed on the screen. Therefore, the projector is widely used in public places such as company and school, etc. Moreover, as home display products are developed towards a trend of large size, the projector is gradually popularised in general household, and becomes a daily used electronic product in modern life.

In some occasions, images to be projected are super-resolution images, and are probably non-standard format images. In view of a projection distance, an ultra-high brightness projection light source is used to project the super-resolution images, and the projector used for projecting the non-standard format images is specifically manufactured. Therefore, if a single projector is used to project the super-resolution and non-standard format image, the hardware cost of the projector is very high. If a plurality of projectors is used to project the super-resolution and non-standard format images through image blending, the hardware cost is greatly decreased. However, in case that the projected images are blended, how to maintain the image quality is a major subject of the projection system.

U.S. Pat. No. 7,366,886 discloses a computer system having a computer main body and a monitor displaying a video signal from the computer main body and a control method thereof. The control method includes following steps. Storing a display information of the video signal displayed on the monitor based on extended display identification data (EDID) supplied from the monitor in the computer main body. Determining whether the display information of an input video signal transmitted from the computer main body to the monitor is suitable for the EDID of the monitor. Displaying the input video signal if the display information of the input video signal is suitable for the EDID and supplying an error signal to the computer main body if the display information of the input video signal is not suitable for the EDID. Processing the input video signal according to the display information stored in the computer main body and supplying it to the monitor if the error signal is supplied to the computer main body.

SUMMARY

The invention is directed to a projection system and an operation method thereof, which is capable of projecting a non-standard format image while maintaining image quality.

Additional aspects and advantages of the invention will be set forth in the description of the techniques disclosed in the invention.

To achieve one of or all aforementioned and other advantages, an embodiment of the invention provides a projection system including a video and audio source, an image duplication unit, a plurality of image segmentation units, and a plurality of projectors. The video and audio source receives a sum image parameter, and correspondingly provides a non-standard format image. The image duplication unit is coupled to the video and audio source, and receives a plurality of image parameters. The image duplication unit provides the sum image parameter according to the image parameters. The image segmentation units are coupled to the image duplication unit, and respectively provide the corresponding image parameters. Each of the image segmentation units receives the non-standard format image through the image duplication unit, and segments a part of the non-standard format image as a standard format image. The standard format images provided by the image segmentation units are partially overlapped with each other. The projectors are respectively coupled to the corresponding image segmentation unit for displaying according to the standard format image provided by the corresponding image segmentation unit.

To achieve one of or all aforementioned and other advantages, an embodiment of the invention provides an operation method of a projection system. The projection system includes a video and audio source, an image duplication unit, a plurality of image segmentation units, and a plurality of projectors. The operation method of the projection system includes following steps. The image duplication unit provides a sum image parameter according to a plurality of image parameters provided by the image segmentation units. The video and audio source provides a non-standard format image corresponding to the sum image parameter. Each of the image segmentation units converts the non-standard format image into a standard format image, and the standard format images provided by the image segmentation units are partially overlapped with each other. The projectors display respectively according to the standard format images provided by the image segmentation units.

According to the above descriptions, in an embodiment of the invention, the video and audio source of the projection system correspondingly provides the non-standard format image according to the sum image parameter provided by the image duplication unit, and the image segmentation unit segments a part of the non-standard format image as the standard format image to control the image projected by the projector. In this case, under a condition of maintaining the image quality, the non-standard format image is projected through image blending.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
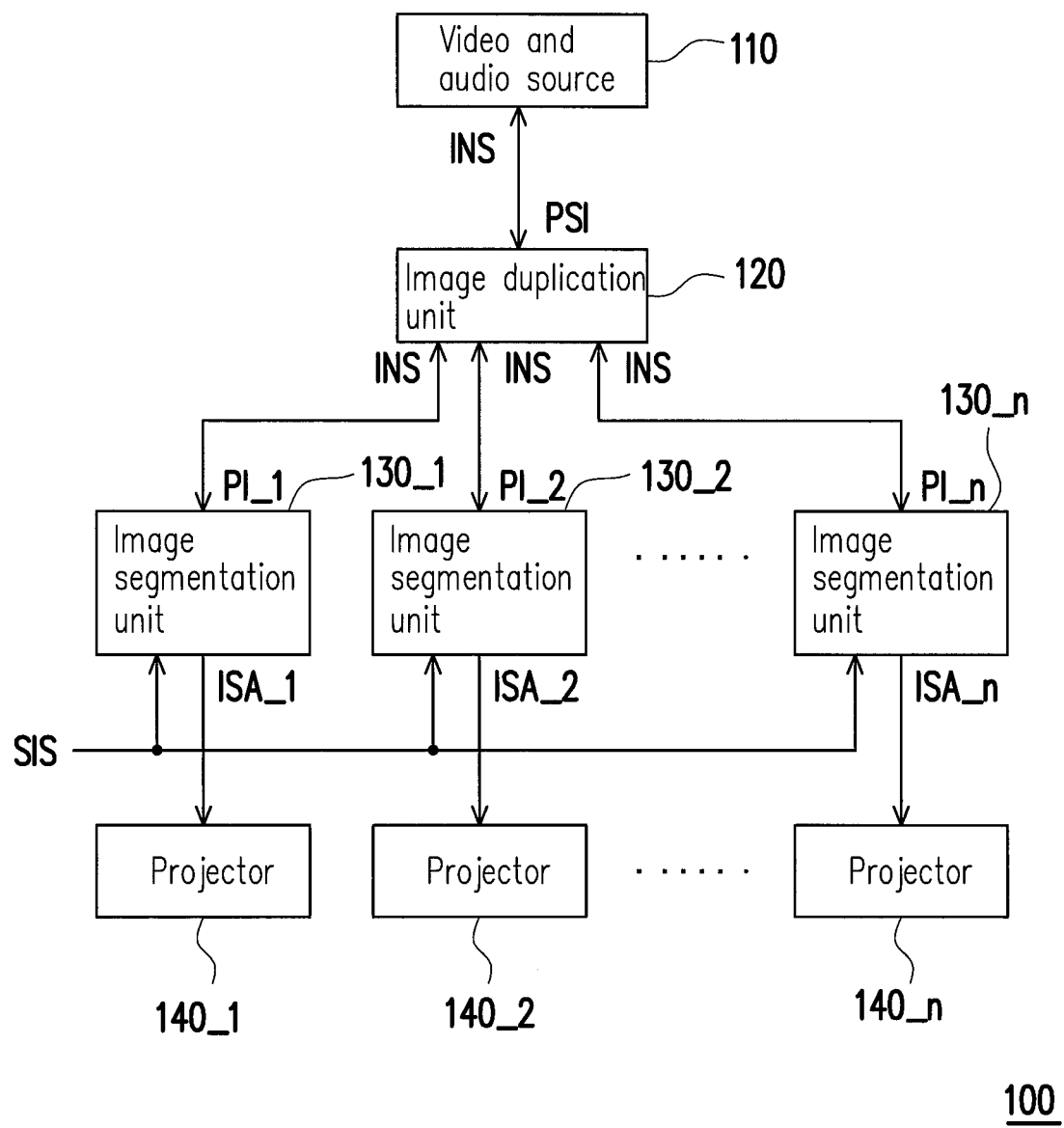
FIG. 1 is a schematic diagram of operating of a projection system according to an embodiment of the invention.

Referring to FIG. 1, in the embodiment, the projection system 100 includes a video and audio source 110, an image duplication unit 120, a plurality of image segmentation units 130_1-130_n, and a plurality of projectors 140_1-140_n, where n is a positive integer greater than or equal to 2, and the audio and video source 110 is, for example, a computer device, and the image segmentation unit 130 is, for example, an image blending box.

The video and audio source 110 is coupled to the image duplication unit 120, and receives a sum image parameter PSI provided by the image duplication unit 120, and correspondingly provides a non-standard format image INS, where the sum image parameter PSI may be extended display identification data (EDID). The image duplication unit 120 is coupled to the image segmentation units 130_1-130_n, and receives a plurality of image parameters PI_1-PI_n provided by the image segmentation units 130_1-130_n. One of the image parameters PI_1-PI_n is transmitted to the video and audio source 110 through the image duplication unit 120. Moreover, the image segmentation units 130_1-130_n are coupled to the image duplication unit 120, and may respectively provide corresponding image parameters (for example, PI_1-PI_n) to the video and audio source 110 through the image duplication unit 120. The image duplication unit 120 provides the non-standard format image INS received from the video and audio source 110 to the image segmentation units 130_1-130_n, i.e. each of the image segmentation units 130_1-130_n (for example, 130_1-130_n) receives the non-standard format image INS through the image duplication unit 120. Moreover, each of the image segmentation units (for example, 130_1-130_n) segments a part of the non-standard format image INS as a standard format image (for example, ISA_1-ISA_n). The standard format images (for example, ISA_1-ISA_n) provided by the image segmentation units 130_1-130_n are partially overlapped with each other, i.e. the image of each of the standard format images (for example, ISA_1-ISA_n) at an edge region is the same with the image of the adjacent standard format image (for example, ISA_1-ISA_n) at the edge region, and a size of the edge region is proportional to an image overlap rate of the standard format images ISA_1-ISA_n. The standard format image is, for example, XGA, 1080P, WUXGA, and WXGA, etc., and the non-standard format image is the image having a format other than the commonly used standard formats.

Each of the projectors 140_1-140_n is coupled to the corresponding image segmentation unit (for example, 130_1-130_n), and displays according to the standard format image (for example, ISA_1-ISA_n) provided by the corresponding image segmentation unit (for example, 130_1-130_n). In other words, the projector 140_1 receives the standard format image ISA_1 provided by the image segment unit 130_1 to display, the projector 140_2 receives the standard format image ISA_2 provided by the image segment unit 130_2 to display, and the others are deduced by analogy.

In the embodiment, the image segment units 130_1-130_n receive an image setting signal SIS (the image setting signal SIS is provided by an external computer), and provide the image parameters PI_1-PI_n according to the image setting signal SIS, where the image parameters PI_1-PI_n may correspond to a same resolution, and the resolution corresponding to the image parameters PI_1-PI_n may be a resolution of the non-standard format image INS. According to the above descriptions, the image duplication unit 120 is unnecessary to process the image parameters PI_1-PI_n, and may selectively outputs one of the image parameters PI_1-PI_n to serve as the sum image parameter PSI. At this time, a circuit of the image duplication unit 120 may be simplified to decrease the hardware cost thereof. Moreover, if the resolution corresponding to the image parameters PI_1-PI_n provided by the image setting signal SIS is the resolution of the standard format image, it may be modified to be the resolution of the non-standard format image.

In case that the image quality is considered, projectors with the same optimum resolution are used for image projection, i.e. the optimum resolutions of the projectors 140_1-140_n may be completely the same, and the projectors 140_1-140_n with the same model and same set are used. In order to decrease image distortion caused by the projectors 140_1-140_n scaling the received images, the resolution of the standard format images ISA_1-ISA_n provided by the image segmentation units 130_1-130_n may be the same with the optimum resolution(s) of the projectors 140_1-140_n.

In an embodiment of the invention, each of the image segmentation units (for example, 130_1-130_n) may capture a corresponding part of the non-standard format image INS to generate a corresponding standard format image (for example, ISA_1-ISA_n), so as to segment a part of the non-standard format image INS as the standard format image (for example, ISA_1-ISA_n).

Figure 2:
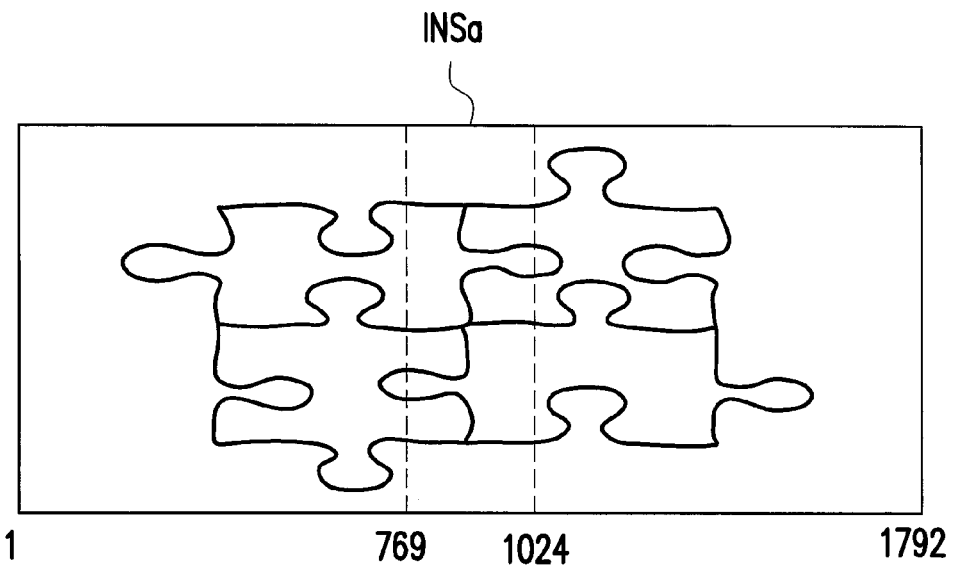
FIG. 2 is a schematic diagram of a non-standard format image according to an embodiment of the invention.

Referring to FIG. 1 and FIG. 2, in the embodiment, it is assumed that the number of the projectors 140_1-140_n is 2, i.e. it is set n=2, and the optimum resolution of the projectors 140_1 and 140_2 corresponds to extended graphics array (XGA), i.e. the optimum resolution of the projectors 140_1 and 140_2 is 1024×768, and it is assumed that the image overlap rate of the standard format images ISA_1 and ISA_2 is 25%.

In the embodiment, it is assumed that the images projected by the projectors 140_1 and 140_2 are horizontally blended, in this case, the resolution of the sum image parameter PSI is 1792×768, i.e. a height of the image is set to 768, and a width of the image is set to 1792 (i.e. 1024×2−1024×25%). Now, the video and audio source 110 provides a non-standard format image INSa according to the resolution of the sum image parameter PSI.

Then, the image segmentation unit 130_1 would capture a left side image (i.e. image of a first column to a $1024^{th}$ column) of the non-standard format image INSa to output the standard format image ISA_1. The image segmentation unit 130_2 would capture a right side image (i.e. image of a $769^{th}$ column to a $1792^{th}$ column) of the non-standard format image INSa to output the standard format image ISA_2. Then, the projectors 140_1 and 140_2 respectively display according to the standard format images ISA_1 and ISA_2, so as to display a wider image through horizontal image blending.

In the embodiment, two projectors are used to blend the wider image, though in the other embodiments, more projectors may be used to blend even wider image or a surrounding image, and the operation method of the projection system may refer to the aforementioned embodiment for understanding and adjustment, which is not repeated.

Figure 3:
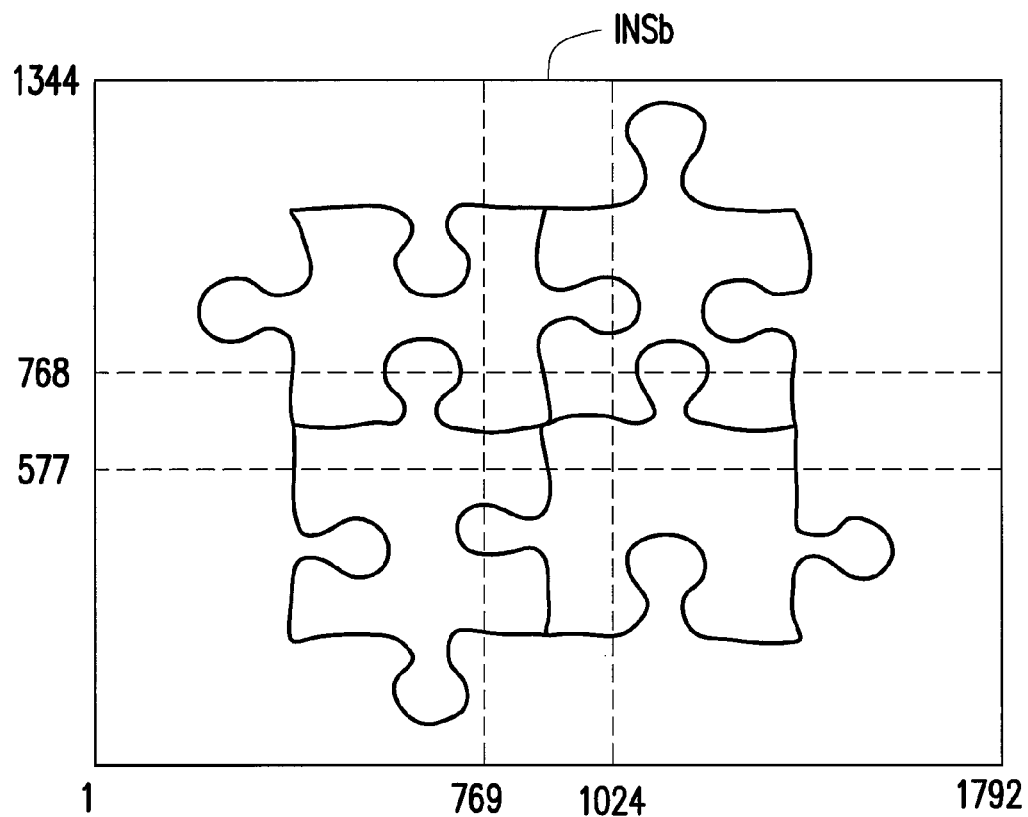
FIG. 3 is a schematic diagram of a non-standard format image according to another embodiment of the invention.

Referring to FIG. 1 and FIG. 3, in the embodiment, it is assumed that the number of the projectors 140_1-140_n is 4, i.e. it is set n=4, and the optimum resolution of the projectors 140_1 and 140_4 corresponds to the XGA, i.e. the optimum resolution of the projectors 140_1 and 140_4 is 1024×768, and it is assumed that the image overlap rate of the standard format images ISA_1 and ISA_4 is 25%.

In the embodiment, it is assumed that the images projected by the projectors 140_1 and 140_4 are blended in an array, in this case, the resolution of the sum image parameter PSI is 1792×1344, i.e. a height of the image is set to 1344 (i.e. 768×2−768×25%), and a width of the image is set to 1792 (i.e. 1024×2−1024×25%). At this time, the video and audio source 110 provides a non-standard format image INSb according to the resolution of the sum image parameter PSI.

Then, the image segmentation unit 130_1 would capture a lower left side image (i.e. a first row to a $768^{th}$ row in the image of a first column to a $1024^{th}$ column) of the non-standard format image INSb to output the standard format image ISA_1. The image segmentation unit 130_2 would capture a lower right side image (i.e. the first row to the $768^{th}$ row in the image of a $769^{th}$ column to a $1792^{th}$ column) of the non-standard format image INSb to output the standard format image ISA_2. The image segmentation unit 130_3 would capture an upper left side image (i.e. a $577^{th}$ row to a $1344^{th}$ row in the image of a first column to a $1024^{th}$ column) of the non-standard format image INSb to output the standard format image ISA_3. The image segmentation unit 130_4 would capture an upper right side image (i.e. the $577^{th}$ row to the $1344^{th}$ row in the image of the $769^{th}$ column to the $1792^{th}$ column) of the non-standard format image INSb to output the standard format image ISA_4. Then, the projectors 140_1 and 140_4 respectively display according to the standard format images ISA_1 and ISA_4, so as to display a wider image through array image blending.

In the embodiment, four projectors are used to blend the wider image in a 2×2 array, though in the other embodiments, more projectors may be used to blend even wider image (for example, 3×2, 2×3, 3×3) in other arrays, and the operation method of the projection system may refer to the aforementioned embodiment for understanding and adjustment, which is not repeated.

Figure 4:
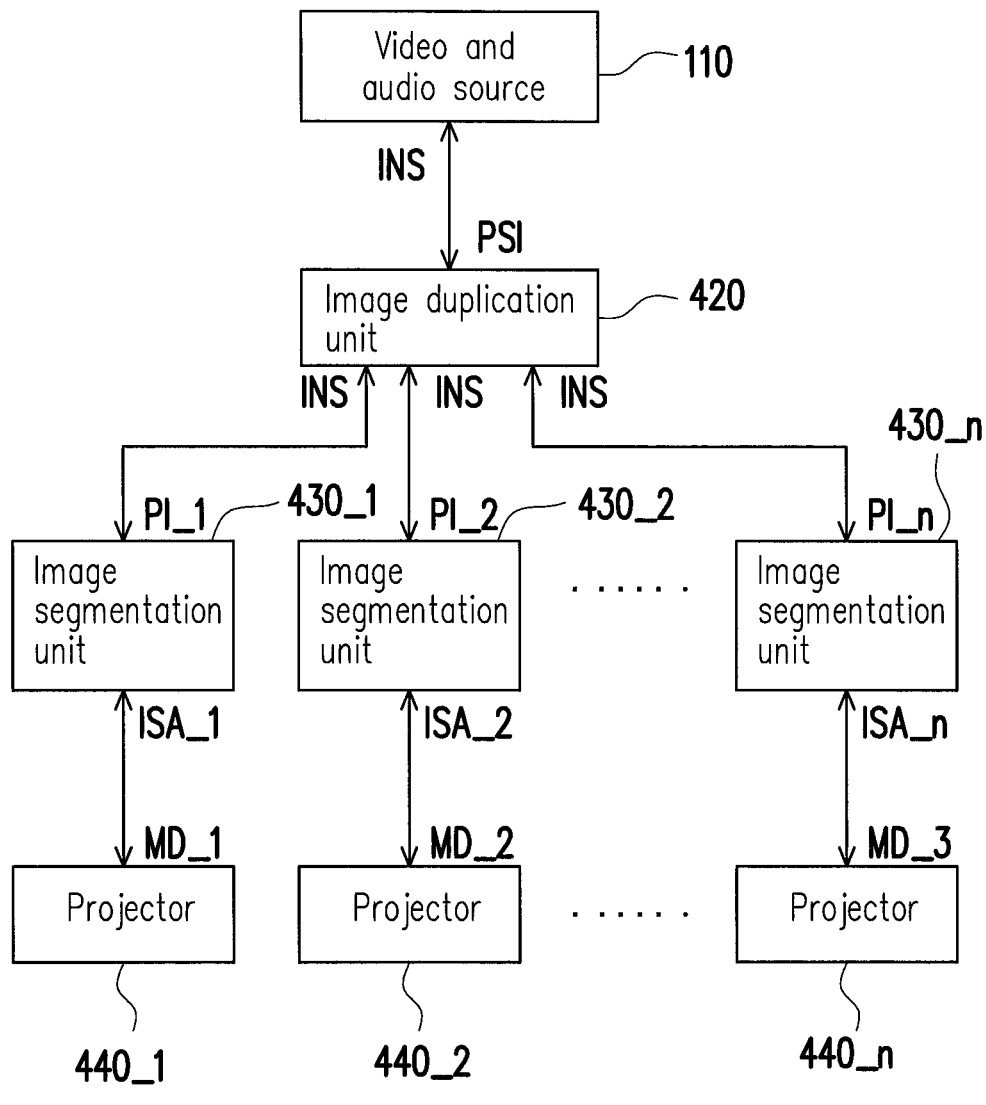
FIG. 4 is a schematic diagram of operating of a projection system according to another embodiment of the invention.
Figure 5:
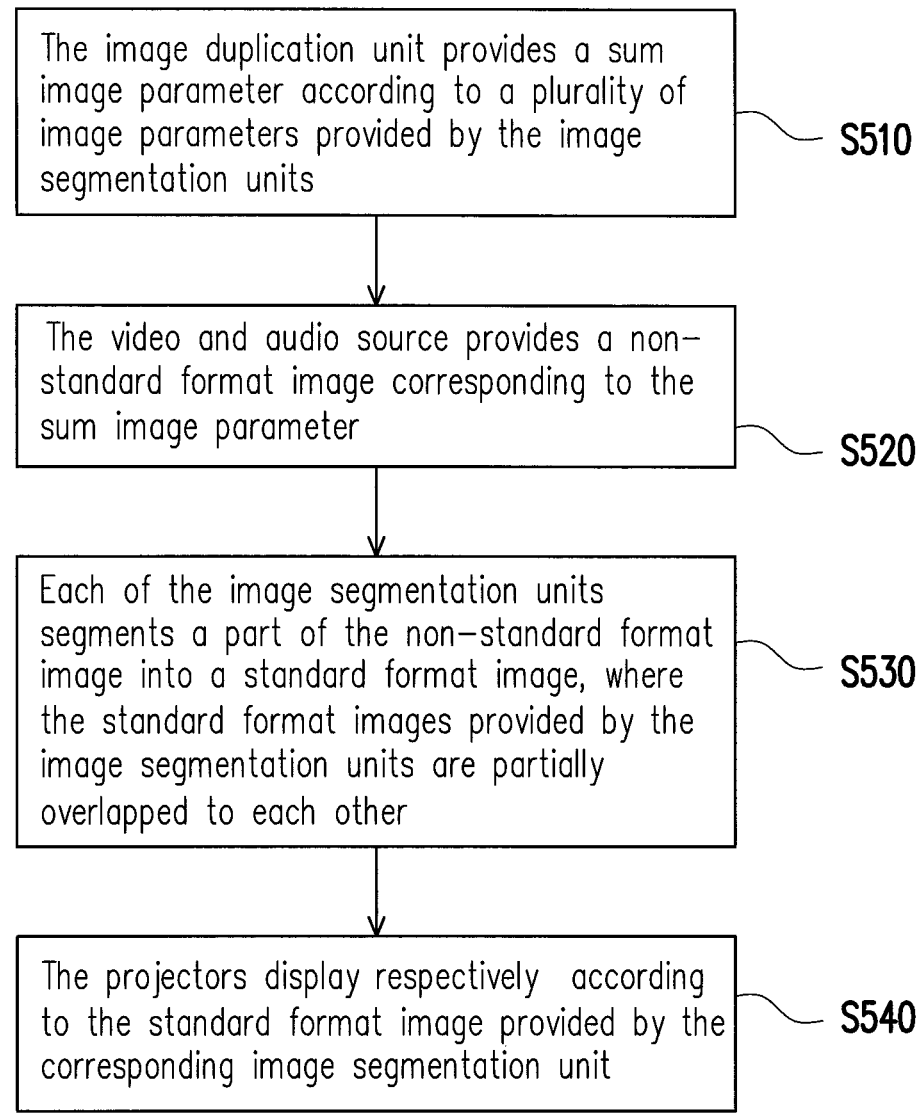
FIG. 5 is a flowchart illustrating an operation method of a projection system according to an embodiment of the invention.

Referring to FIG. 1 and FIG. 4, the projection system 100 is similar to the projection system 400, and a difference therebetween lies in referential numbers of the image duplication unit 420, the image segmentation units 430_1-430_n and the projectors 440_1-440_n, and the other same or like components are denoted by the same or like referential numbers.

In the embodiment, the image segmentation units 430_1-430_n respectively inspect optimum resolutions (for example, MD_1-MD_n) of the corresponding projectors (for example, 440_1-440_n_), and provide the image parameters PI_1-PI_n according to the inspected optimum resolutions (for example, MD_1-MD_n). The image duplication unit 420 would calculate according to the image parameters PI_1-PI_n and the image overlap rate to generate the sum image parameter PSI. A calculation method of the resolution of the sum image parameter PSI may refer to the embodiments of FIG. 2 and FIG. 3, which is not repeated.

In the embodiment, the projection system includes a video and audio source, an image duplication unit, a plurality of image segmentation units, and a plurality of projectors. The operation method of the projection system includes following steps. The image duplication unit provides a sum image parameter according to a plurality of image parameters provided by the image segmentation units (step S510). The video and audio source provides a non-standard format image corresponding to the sum image parameter (step S520). Each of the image segmentation units segments a part of the non-standard format image into a standard format image, where the standard format images provided by the image segmentation units are partially overlapped to each other (step S530). The projectors display respectively according to the standard format image provided by the corresponding image segmentation unit (step S540). The above step sequence is only used as an example, and the invention is not limited thereto, and details of the above steps may refer to the embodiment of FIG. 1 to FIG. 4, which are not repeated.

In summary, in the projection system and the operation method thereof provided by the invention, the video and audio source of the projection system correspondingly provides the non-standard format image according to the sum image parameter provided by the image duplication unit, and the image segmentation units segment a part of the non-standard format image as the standard format image to control the image projected by the projector. In this case, under a condition of maintaining the image quality, the non-standard format image is projected through image blending. Moreover, the projectors with the same optimum resolution may be used to improve the image quality of the projected blending image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection system, comprising:
a video and audio source, receiving a sum image parameter, and correspondingly providing a non-standard format image;
an image duplication unit, coupled to the video and audio source, receiving a plurality of image parameters, and providing the sum image parameter according to the image parameters;
a plurality of image segmentation units, coupled to the image duplication unit, and respectively providing the corresponding image parameter, wherein each of the image segmentation units receives the non-standard format image through the image duplication unit and segments a part of the non-standard format image as a standard format image, wherein the standard format images provided by the image segmentation units are partially overlapped with each other; and
a plurality of projectors, respectively coupled to the corresponding image segmentation unit, for displaying according to the standard format image provided by the corresponding image segmentation unit.

2. The projection system as claimed in claim 1, wherein each of the image segmentation units captures a corresponding part of the non-standard format image to generate the corresponding standard format image.

3. The projection system as claimed in claim 1, wherein the image segmentation units receives an image setting signal, and provide the image parameters according to the image setting signal, and the image duplication unit selects one of the image parameters to serve as the sum image parameter.

4. The projection system as claimed in claim 1, wherein the image segmentation units respectively inspect optimum resolutions of the projectors to provide the image parameters, and the image duplication unit calculates according to the image parameters and an image overlap rate to generate the sum image parameter.

5. The projection system as claimed in claim 1, wherein optimum resolutions of the projectors are completely the same.

6. The projection system as claimed in claim 1, wherein a resolution of the standard format image is the same with an optimum resolution of the projections.

7. The projection system as claimed in claim 1, wherein the video and audio source is a computer device.

8. An operation method of a projection system, wherein the projection system comprises a video and audio source, an image duplication unit, a plurality of image segmentation units, and a plurality of projectors, and the operation method of the projection system comprising:
providing a sum image parameter by the image duplication unit according to a plurality of image parameters provided by the image segmentation units;
providing a non-standard format image corresponding to the sum image parameter by the video and audio source;
segmenting a part of the non-standard format image as a standard format image by each of the image segmentation units, wherein the standard format images provided by the image segmentation units are partially overlapped with each other; and
displaying by the projectors respectively according to the standard format images provided by the image segmentation units.

9. The operation method of the projection system as claimed in claim 8, wherein the step of segmenting a part of the non-standard format image as the standard format image by each of the image segmentation units comprises:
capturing a corresponding part of the non-standard format image by each of the image segmentation units to generate the corresponding standard format image according to an optimum resolution of the corresponding projector.

10. The operation method of the projection system as claimed in claim 8, wherein the step of providing the sum image parameter by the image duplication unit according to the image parameters provided by the image segmentation units comprises:
receiving an image setting signal and providing the image parameters according to the image setting signal by the image segmentation units; and
selecting one of the image parameters by the image duplication unit to serve as the sum image parameter.

11. The operation method of the projection system as claimed in claim 8, wherein the step of providing the sum image parameter by the image duplication unit according to the image parameters provided by the image segmentation units comprises:
respectively setting optimum resolutions of the projectors by the image segmentation units to provide the image parameters, and calculating by the image duplication unit according to the image parameters and an image overlap rate to generate the sum image parameter.

12. The operation method of the projection system as claimed in claim 8, wherein optimum resolutions of the projectors are completely the same.

13. The operation method of the projection system as claimed in claim 8, wherein a resolution of the standard format image is the same with an optimum resolution of the projections.

14. The operation method of the projection system as claimed in claim 8, wherein the video and audio source is a computer device.

* * * * *